Sept. 11, 1945.                A. F. HASBROOK                2,384,739
                       GEOPHYSICAL PROSPECTING APPARATUS
              Original Filed March 18, 1943    2 Sheets-Sheet 1
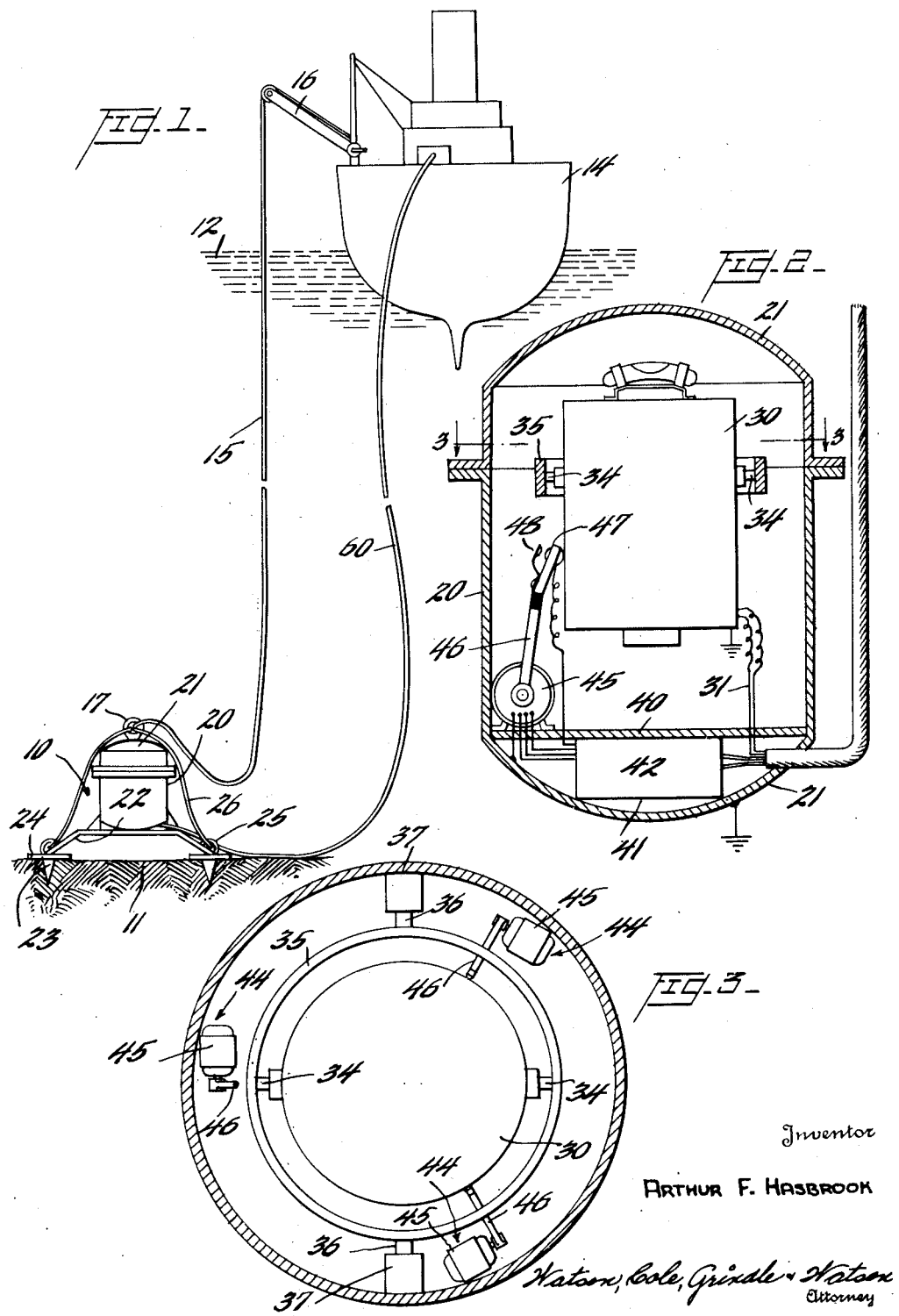
Inventor
ARTHUR F. HASBROOK
Watson, Cole, Grindle & Watson
Attorney

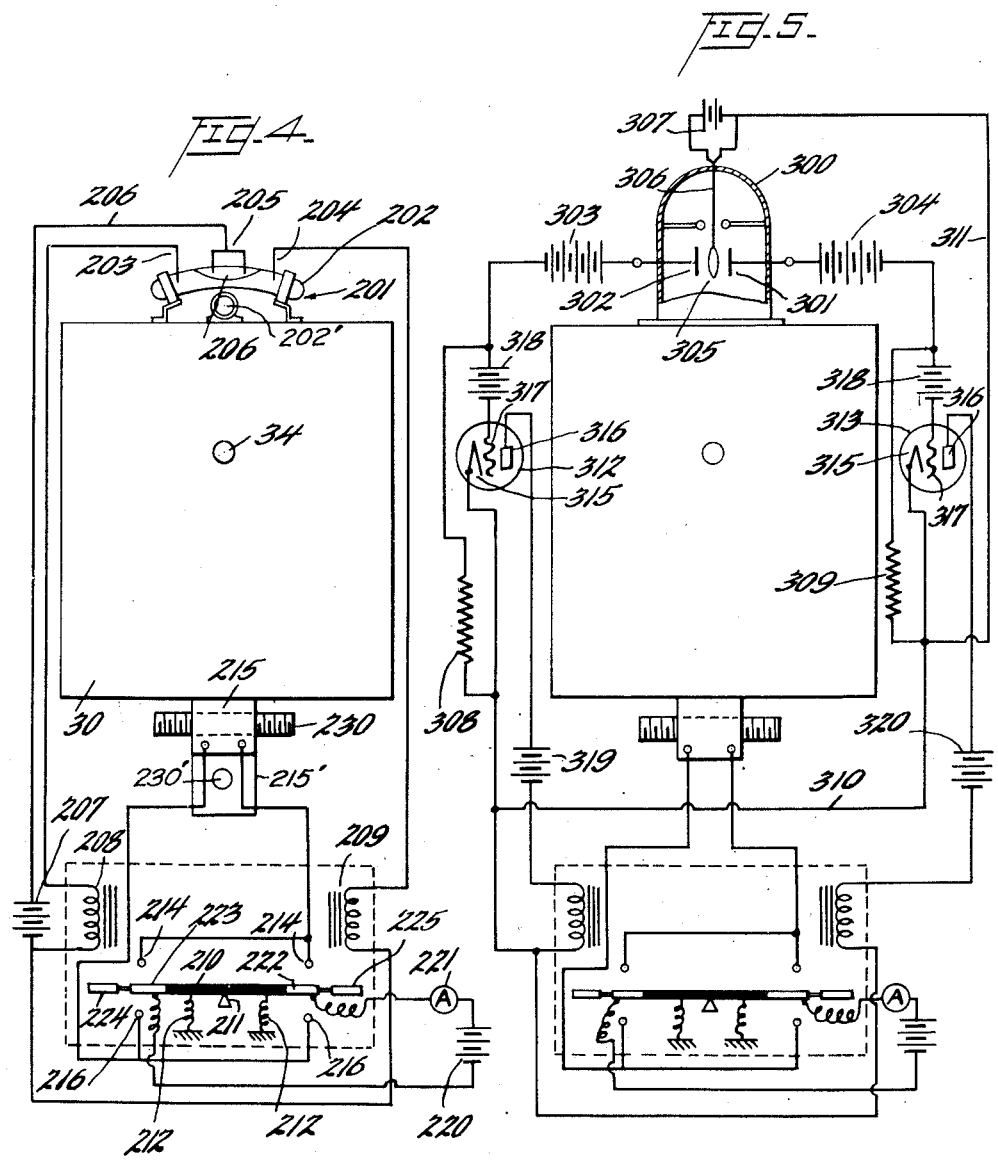

Patented Sept. 11, 1945

2,384,739

UNITED STATES PATENT OFFICE 2,384,739

GEOPHYSICAL PROSPECTING APPARATUS

Arthur F. Hasbrook, San Antonio, Tex., assignor to Olive S. Petty, San Antonio, Tex.

Original application March 18, 1943, Serial No. 479,631. Divided and this application February 9, 1944, Serial No. 521,665

5 Claims. (Cl. 73—382)

This invention relates to apparatus for submarine geophysical prospecting and to the mounting and leveling of such delicate apparatus.

More particularly it is an object of the invention to provide submarine geophysical prospecting apparatus including a water-tight housing and an instrument suspended within the same for substantially automatic leveling, together with compensating leveling apparatus. Clamping means may be provided, whereby the instrument casing and housing may be locked together as a protection to the delicate apparatus during handling, lifting, and submerging of the housing, the clamping means per se being disclosed and claimed more particularly in my prior application Ser. No. 479,631, filed March 18, 1943, of which this application is a division.

An important feature of the invention resides in the automatic leveling means which is controlled by level detecting apparatus associated with the instrument or its casing and adapted to position the instrument in such exact level about coordinate axes as is necessary for its correct operation.

Other and further objects and detailed features of the invention will be more apparent to those skilled in the art upon a consideration of the accompanying drawings and following specification wherein are disclosed several exemplary embodiments with the understanding that they may be variously combined, modified, or changed in accordance with the scope of the appended claims without departing from the spirit of the invention.

In said drawings:

Figure 1 is a view illustrating apparatus constructed according to the present invention shown positioned on the floor of a body of water and arranged to be controlled and operated from a surface craft;

Figure 2 is a transverse vertical section through the housing showing the universal mounting for the casing and the clamping apparatus therefor;

Figure 3 is a transverse section taken on line 3—3 of Figure 2;

Figure 4 is a schematic and diagrammatic showing of the instrument casing provided with level detecting means and automatic leveling apparatus; and Figure 5 is a view similar to Figure 4 showing a modification using thermionic leveling.

It is often desirable or essential, in carrying out various types of geophysical reconnaissance, to work over submerged areas which are included in the terrain being considered. No satisfactory way has ever been worked out for carrying the equipment necessary for this work and using the same from a surface craft. Such apparatus which may include gravity meters, torsion balances, magnetometers, and the like, is extremely delicate and sensitive to movement, variation in level, etc. It cannot be maintained sufficiently stationary and level on any known form of surface craft to produce reliable results. For this reason, resort must be had to housing the equipment in a waterproof chamber which is lowered to the floor of the body of water, substantially mounted thereon and then accurately leveled. It has heretofore been proposed to suspend the instrument, which is normally arranged in a closed casing, from the walls of the water-tight housing by means of gimbals or pendulum-like suspensions. These types of suspensions, however, because of inherent friction and other faults, partially contributed to by the presence of moisture, corrosion, and the like, cannot be relied upon to provide the high degree of accuracy of leveling which is so essential to the making of satisfactory records. The present invention provides apparatus for automatically making the necessary minute adjustments after the apparatus has found a substantial level from its suspension equipment.

Referring now to the drawings and first to Figure 1 for a general disclosure of the apparatus and the mode of using the same, it will be noted that the submersible geophysical prospecting equipment 10 is resting on the bottom or floor 11 of a body of water 12, at the surface of which is the vessel 14, navigable in the water and anchored, in a manner not shown, to be nearly vertically above the apparatus. A suitable handling cable 15 swung from a hoisting boom 16 on the boat is attached to a ring 17 at the top of the apparatus and is used for lowering and lifting the same.

The apparatus is fully enclosed in a water-tight housing 20 of cylindrical form provided with convex heads 21. It is provided with tripod legs 22 each having a sharp vertical spike 23 thereon, topped by a broad flat plate 24 to limit penetration into soft subsoil. Each leg is conveniently provided with a ring 25 to which the bridles 26 are attached which merge into the hoisting ring 17. The tripod legs are well spread to give a stable support to the apparatus which has sufficient initial weight to locate itself firmly on the bottom, be it soft or hard, so that the apparatus may remain in a fixed position after a brief period for settling. The exact form of the outer housing and the arrangement of its supporting legs and feet form no part of the present invention which primarily deals with the mounting and leveling of the geophysical apparatus within the water-tight housing.

In Figure 2, the housing, minus its supporting and hoisting parts, is shown at 20 and within the same is any desired type of instrument used for geophysical prospecting; for the sake of this description this will be hereinafter referred to as a gravity meter. Such a meter is preferably enclosed in a casing 30 which may be water-tight and heat-insulating. The form of gravity meter preferred for use in this arrangement is one such as illustrated in the copending application of Olive S. Petty, Serial No. 366,495, which is of the electrical type capable of exhibiting its readings at a remote point. The particular advantage of such an arrangement is that the readings may be conducted to the surface through conductors 31 passing in a water-tight manner through the casing 30 and housing 20 and extending to the surface through a cable 60 along with such other conductors as may be needed to control and operate the instrument.

As seen both in Figures 2 and 3, the casing 30 is provided on the extension of one of its diameters with trunnions 34, journalled in a gimbal ring 35 having trunnions 36 on an axis at right angles to that containing the trunnions 34 and which are journalled in bosses 37 in the housing 20. The vertical disposition of the gimbal supporting arrangement is well above the center of gravity of the instrument assembly and casing 30 so that the same tends to come to a level automatically. However, certain inequalities in the bearing, the inability to make them entirely friction-free, the necessity for lubricant to prevent corrosion, the variations in temperature taking place, the presence of moisture, and the stiffness of the conductors 31, all make it impossible to rely on the instrument coming to an exact level within the tolerances permitted for proper operation of the gravity meter. Means are therefore provided such as shown in Figures 4 and 5, and which will be later described, for bringing the apparatus to an exact level.

Naturally the gimbal bearings and pivots are quite free so that the casing 30 can move about within wide limits in the housing. The instrument in the casing 30 is extremely delicate because of its high sensitivity and cannot stand much shaking about. In order to prevent relative movement between the cased instrument and the housing a system of clamps is provided adapted to lock the two parts together when desired and to release them so that the instrument can find its level after the whole device has been set on the floor of the body of water. In general the clamping means may be said to comprise arms which can be projected from one of the parts to be locked toward and into engagement with the other, together with electrical means for stopping the movement when this engagement takes place. In the embodiment shown, the clamping devices are carried by the housing and specifically from the sub-floor 40 therein which provides a bottom compartment 41 in which some of the auxiliary apparatus 42 may be housed.

As seen in Figure 3, the clamping devices 44 are three in number disposed at 120° intervals about the casing and each includes a slow speed or geared electric motor 45 of the reversible type and an arm 46 movable by the motor so that its tip engages the casing 30 well below the plane of the gimbal support. For purposes which will be later described, the arms are either formed of insulating material or are insulated from the motor or from the contact devices 47 and 48 at their ends.

It will be appreciated that the housing when in position on the floor of the body of water may rest at a substantial angle from the vertical, whereas the axis of the casing 30 should be truly vertical. This means then that when locking takes place preparatory to lifting the apparatus, that the arms 46 on the several motors will have to move different distances if they are each to just snugly engage the casing. To provide for this variation in the amount of movement of the several arms, each one is arranged with a contact device 47 positioned to engage the casing 30 and make electrical contact therewith. The closing of a circuit by this engagement actuates mechanism about to be described which stops the motor.

In a like manner, when the arms are withdrawn, they may have to travel different distances so that back-stops may be provided but preferably for the sake of simplicity the arms merely swing in a reverse direction until they engage the inner wall of the housing. A spring contact 48 on each arm is conveniently arranged to touch the housing wall and to engage the rear end of the contact 47 to close a circuit which stops the motor when the arm has reached its fully retracted position. A circuit arrangement for controlling these movements of the arms 46 is shown and claimed in my parent application hereinbefore mentioned, but is omitted from this application in order to simplify the disclosure.

It has previously been mentioned that reliance cannot be placed on purely automatic leveling resulting from the gimbal type of support for the casing within the housing. Figure 4 illustrates one embodiment of an arrangement for compensating for inequalities in leveling and which operates entirely automatically. It will be appreciated that it is highly desirable to have the gimbal trunnions operate as freely as possible at all times so this device makes no effort to correct leveling by acting through these trunnions. It merely shifts the position of compensating weights on the casing to bring the apparatus to a true level.

In the drawings, there is shown mounted on the casing a level determining means 201. For convenience this is illustrated on top of the casing, but obviously it may be placed inside or at any convenient location. The apparatus shown, but not in a limiting sense, is a bubble type mercury tube 202, in the upper surface of which are inserted outer contacts 203 and 204, and a pair of inner contacts 205. The bubble 206 in the tube, in normal position, leaves the center contacts bare and is of sufficient longitudinal extent to also bare one of the outer contacts when the tube is tilted, but in order to do this the mercury must engage one of the center contacts and the other outer contact. In this manner any substantial out-of-levelness will result in the alternative closing of a circuit between 203 and 205, or 204 and 205. A conductor 206 connected to the pair of center contacts leads to one terminal of battery 207, the opposite pole of which is connected to the lower terminal of each of a pair of relay coils or electromagnets 208, 209. The upper terminals of these relay coils are respectively connected to outer level contacts 203 and 204.

In a level position of the casing 30 the circuits to both magnets are opened at 205, but any slight out-of-levelness energizes one or the other of these magnets. The magnets are associated with a balanced insulating beam 210 of a motor reversing switch. The fulcrum 211 and the coil springs 212 normally serve to hold this beam in horizontal position with its contact plates out of engagement with both upper stationary contacts 214, which are connected together and to one pole of motor 215, and with lower stationary contacts 216 connected to each other and to the opposite pole of motor 215.

A motor energizing battery 220 has one pole connected through ammeter 221 to a contact plate 222 on the balanced beam 210, through a flexible pigtail, while the other terminal of the battery is similarly connected to a contact plate 223 at the opposite end of the balanced beam. Each end of this beam supports one of the armature plates 224 and 225 appropriately associated with magnets 208 and 209 respectively. It will be seen that when the beam is tilted by the lifting of armature 225 by coil 209 that current from the top side of the battery flows to the right-hand motor terminal through the engagement of 214 with 222 and returns from the motor through the engagement of 216 with 223. When the beam is tilted in the opposite direction the reverse poles of the motor are connected to the battery.

The motor is only illustrated schematically. It may have a permanent magnet field or one separately energized from the battery so that the direction of rotation may readily be reversed by the switch just described. The motor is in control of the longitudinal movement of a balance weight 230. As shown, the weight is a heavy, threaded rod which is adapted to move slowly longitudinally when rotated by the motor and in the appropriate sense.

The operation of the mechanism for automatically balancing the casing so that it assumes a true horizontal position will now be apparent. It will be seen that unbalance which causes engagement of the mercury with contacts 204 and 205 will energize magnet 208 and close the motor circuit to move the balance weight 230 in a sense to overcome the unbalance. The motor operates very slowly and is so arranged that it has no over-run. Thus as soon as the operating magnet circuit is deenergized by the bubble becoming centered, reversing switch 210 is brought to a neutral position and movement of the weight ceases. The bubble is sufficiently large to prevent hunting.

The structure just described may be duplicated for the purpose of correcting the level of the casing about the other gimbal trunnions 36; for example, by providing a second bubble tube 202', extending at right angles to the first bubble tube, and a second motor 215' having associated therewith a balance weight 230' which is displaced by the motor transversely of the axis of gimbal trunnions 36. The bubble tube 202' and the motor 215' are operatively associated with a circuit identical with that described with reference to the bubble tube 202 and motor 215, duplication of this circuit on the drawings being omitted in the interest of clarity.

In Figure 5 the reversing switch mechanism is identical with that just described in connection with Figure 4, and the balancing motor and weight are the same. The means for detecting out-of-balance, however, is of the electronic variety and comprises an evacuated bulb 300 containing a pair of identical anodes 302 and 301, each connected to an appropriate battery 303 and 304. The cathode 305 is suspended midway between the anodes in the manner of a pendulum by a very flexible pair of conductors 306 which carry the heating current for the cathode from the battery 307.

The circuit for each anode and its battery is completed back to the cathode through resistors 308 and 309 respectively, each of which is connected to one pole of one of the anode batteries. The opposite ends of these resistors are connected together by conductor 310 and by conductor 311 back to the cathode. It will be seen that under conditions of balance the cathode will assume a mid-position and identical currents will flow from identical batteries 303 and 304 in the two anode circuits, and since resistors 308 and 309 are exactly the same, there will be identical voltage drops across them.

Any unbalance or out-of-levelness of the instrument will swing the cathode toward one of the anodes and greater current will flow in the circuit of the anode which is closest to the cathode and a reduced current in the other, thus producing unequal voltage drops in resistors 308 and 309. The voltage drop in each of these resistors controls the current passing through the circuits of the respective amplifier tubes 312 and 313, the first being associated with the resistor 308 and the second with resistor 309. Each of these tubes which is of conventional form contains a cathode 315, an anode 316, and a control grid 317, biased by a suitable battery 318, connected as shown, so that the fall of potential in its resistor will change the potential on the grid and hence the current flow in the circuit of the anodes, which current is supplied by separate batteries 319 and 320 respectively to the two anodes 316.

If desired the biasing batteries 318 may be adjusted to such potential that there is no current flow under balanced conditions in the anode circuits of the amplifier tubes. With this type of setting, which is perhaps the most senstive, current will flow only in the circuit of the amplifier tube associated with the anode of tube 300 toward which the cathode has moved. In this manner the anode current of the amplifier which flows through the appropriate reversing switch actuating coil will energize that switch to operate the motor to move the weight in a sense to return the casing to a level position.

In another form of adjustment the grids of the amplifier tubes are not biased to full cutoff so that there will only be a differential of current in the two reversing switch coils when correction of level is necessary.

In the form of invention shown in Figure 5 there can be provided four anodes in tube 300 which will serve to provide for control of balancing about two axes if these anodes are spaced at 90° intervals about the cathode.

The control circuits and much of the mechanism employed in connection therewith may conveniently be located at 42 within the bottom compartment 41 of the housing. It will be appreciated that in the case of the leveling apparatus, all equipment may be disposed within the housing, there being no need for surface control of this apparatus.

Having thus described the invention, what is claimed as new and desired to be secured by Letters Patent is:

1. Apparatus for geophysical prospecting on the floors of bodies of water comprising, in com- 1. Apparatus for geophysical prospecting on the floors of bodies of water comprising, in combination, a water-tight housing, means to support the same rigidly on such floor, a geophysical instrument in said housing, gimbals supporting the instrument for substantial self-leveling within the housing, means carried by said instrument to detect out-of-level conditions thereof, a weight carried by said instrument and movable to positions to correct the balance and level of the casing, and devices responsive to the detecting means on occurrence of out-of-level conditions for displacing said weight to cause the instrument to swing in said gimbals to a level position.

2. Apparatus for geophysical prospecting on the floors of bodies of water comprising, in combination, a water-tight housing, means to support the same rigidly on such floor, a cased geophysical instrument in said housing, gimbals supporting the instrument casing for substantial self-leveling within the housing, means carried by said casing to detect out-of-level conditions thereof, level correcting means wholly carried by the casing and comprising a weight movable to positions to correct the balance and level of the casing, a reversible motor associated with the weight to change its position, and apparatus associating the out-of-level detecting means and the motor to operate the latter in response to former to automatically level the casing.

3. Apparatus for geophysical prospecting on the floors of bodies of water comprising, in combination, a water-tight housing, means to support the same rigidly on such floor, a cased geophysical instrument in said housing, gimbals supporting the instrument casing for substantial self-leveling within the housing, a pair of level detecting means carried by said housing and each acting about one trunnion axis of the gimbals, each of said detecting means being adapted to effect a change in the flow of currents in electric circuits and dependent upon the sense of the unbalance, a balancing device carried by said casing for each trunnion axis, each of said devices including a weight movable transverse to the trunnion axis about which it is to correct the balance, a reversible motor adapted to move each weight slowly toward balancing position, each motor being connected for control by the appropriate level detecting means.

4. Apparatus for geophysical prospecting on the floors of bodies of water comprising, in combination, a water-tight housing, means to support the same rigidly on such floor, a cased geophysical instrument in said housing, gimbals supporting the instrument casing for substantial self-leveling within the housing, a pair of level detecting means carried by said housing and each acting about one trunnion axis of the gimbals, each of said detecting means being adapted to effect a change in the flow of currents in electric circuits and dependent upon the sense of the unbalance, a balancing device carried by said casing for each trunnion axis, each of said devices including a weight movable transverse to the trunnion axis about which it is to correct the balance, a reversible motor adapted to move each weight slowly toward balancing position, a reversing switch and source of current for each motor, and means under control of currents in the electric circuits associated with the appropriate level detecting means to actuate said switch to drive the motor in a direction to correct unbalance about the trunnion axis with which the level detecting means is associated.

5. Apparatus for geophysical prospecting on the floors of bodies of water comprising, in combination, a water-tight housing, means to support the same rigidly on such floor, a cased geophysical instrument in said housing, gimbals supporting the instrument casing for substantial self-leveling within the housing, a weight carried by said casing and adapted to be moved in respect to the axis of one set of gimbal trunnions to exactly level the casing about the same, a reversible motor arranged to move said weight, a source of current for said motor, a pair of electric circuits connected to determine the direction of rotation of the motor in accordance with the predominance of current in one or the other of the circuits, and a level detecting means carried by said casing, which means is constructed and arranged to quantitatively regulate the ratio of current in said circuits in such manner as to actuate the motor to correct the balance.

ARTHUR F. HASBROOK.